United States Patent [19]
Yoshida et al.

[11] 3,954,921
[45] May 4, 1976

[54] GAS-LIQUID CONTACTING METHOD AND SCRUBBER USED THEREFOR

[75] Inventors: Osamu Yoshida, Yokohama; Akira Uragami, Funabashi; Isao Furuta, Mitaka, all of Japan

[73] Assignee: Kobe Steel, Ltd., Kobe, Japan

[22] Filed: June 7, 1974

[21] Appl. No.: 477,455

[30] Foreign Application Priority Data
June 9, 1973  Japan.............................. 48-68531

[52] U.S. Cl.............................. 261/116; 261/78 A; 261/DIG. 75; 239/549; 239/550
[51] Int. Cl.². ....................... B05B 7/08; B05B 1/14; B01D 47/06
[58] Field of Search.................. 261/115, 116, 78 A, 261/DIG. 75; 239/543, 544, 545, 549, 550

[56] References Cited
UNITED STATES PATENTS

| | | | |
|---|---|---|---|
| 1,658,533 | 2/1928 | Mart | 261/116 |
| 1,784,019 | 12/1930 | Mart | 261/115 |
| 2,702,535 | 2/1955 | Links | 261/116 |
| 2,708,597 | 5/1955 | Wiitala et al. | 261/116 |
| 2,778,442 | 1/1957 | Jenkins et al. | 261/115 |
| 3,343,341 | 10/1967 | Wiemer | 261/116 |
| 3,365,178 | 1/1968 | Bood | 261/DIG. 75 |
| 3,570,472 | 3/1971 | Santangelo | 261/116 |
| 3,623,668 | 11/1971 | Freid | 239/550 |
| 3,761,065 | 10/1973 | Rich et al. | 261/116 |

*Primary Examiner*—Tim R. Miles
*Assistant Examiner*—Gregory N. Clements
*Attorney, Agent, or Firm*—Oblon, Fisher, Spivak, McClelland & Maier

[57] ABSTRACT

A gas-liquid contacting method and a scrubber used therefor are disclosed which are adapted to remove harmful components, such as SOx, NOx, CO, $Cl_2$ and HCl contained in exhaust gases. According to this invention, liquid is sprayed to follow a conical form and the mist of liquid which is thus being diffused in a conical form is encompassed with a gas flowing in parallel relation therewith. To this end, at least one nozzle for spraying liquid and an encompassing tube for ejecting gas are arranged to specific forms and relations to the effect that an excellent contacting efficiency will result, without increasing energy consumption due to pressure loss.

2 Claims, 2 Drawing Figures

GAS-LIQUID CONTACTING METHOD AND SCRUBBER USED THEREFOR

BACKGROUND OF THE INVENTION

1. Field of the Invention

This invention relates to a gas-liquid contacting method and a scrubber used therefor, and more particularly to a method and a scrubber of a venturi type, which are adapted to remove harmful components such as $SO_x$, $NO_x$, $CO$, $Cl_2$ or $HCl$ contained in exhaust gases therefrom.

2. Description of the Prior Art

Hitherto, many methods and scrubbers of a venturi, spray type design have been proposed, but none of these processes and scrubbers have provided excellent contacting efficiency between the gas and the liquid. Among these are the scrubber of a venturi type having a venturi tube serving as a gas flow passage consisting of a front portion, a throat portion and an enlarging portion, with the front portion or throat portion being equipped with nozzles adapted to spray liquid. This type of a scrubber incorporates a principle, in which gas and liquid are mixed and the mixture thus prepared is then introduced to an enlarging portion, where further intimate mixing is effected between the gas and the liquid, utilizing the variations of dynamic pressure, static pressure and flow speed of fluids. However, the scrubber of such a venturi type suffers from certain disadvantages, such as a considerable degree of pressure loss due to variations in dynamic pressure, static pressure and the flow speed of fluids, in addition to the failure to obtain satisfactory contacting efficiency as compared with the aforesaid considerable degree of pressure loss. Furthermore, this involves a disadvantage in that there is caused a decrease in the contacting efficiency, particularly when the amount of liquid is less as compared with that of gas.

SUMMARY OF THE INVENTION

The present invention is directed to avoiding the aforesaid disadvantages which are experienced with the prior art scrubbers of the venturi type and hence providing a novel but efficient gas-liquid contacting method and a scrubber used therefor.

According to the present invention, there are provided a gas-liquid contacting method and a scrubber used therefor, wherein liquid is sprayed divergently through at least one nozzle and gas is caused to flow in a parallel path with the axis of the nozzle in a manner to encompass the flow of mist of liquid which is diffusing divergently. According to another aspect of the present invention, there is provided an improvement over the aforesaid method, wherein there are created a plurality of mixture flows, each consisting of a diffusing liquid mist and a gas flow directed in parallel relation therewith, and then such plurality of mixture flows are so directed as to form counterflows. To practice the aforesaid method of the present invention, there is provided a gas-liquid contacting scrubber which comprises at least one spray nozzle adapted to eject liquid divergently and a gas ejecting tube disposed in parallel relation with but encompassing the flow of the liquid mist which is being ejected. According to a still further aspect of the present invention, there is provided a gas-liquid scrubber, wherein the tip of the ejection nozzle is located within the gas-ejecting tube but is disposed axially inwardly thereof in a manner that the liquid mist ejected through the nozzle divergently will not impinge on the wall of the gas ejecting tube. In this respect, it is apparent that the provision of a plurality of the spray nozzles directed in the direction opposed to that of the gas ejecting tube will improve the gas-liquid contacting efficiency. Further, according to the present invention, the variations in dynamic pressure, static pressure and flow speed of fluids, when the gas passes through the gas ejecting tube, are less, as compared with those when the fluid passes through the venturi tube, and thus less pressure loss will result. Furthermore, the gas contacts the liquid mist, which is being diffused divergently, in a free space but in an encompassing relation to the liquid mist, such that there will be achieved an increase in the contacting efficiency due to microscopic variations in the flow directions of the gas and the liquid mist. Accordingly, the present invention provides a gas-liquid contacting condition involving less pressure loss and higher contacting efficiency, irrespective of the gas-liquid ratio.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts in the several views and wherein.

DETAILED DESCRIPTION OF THE PREFERRED EMBODIMENTS

Figure 1:
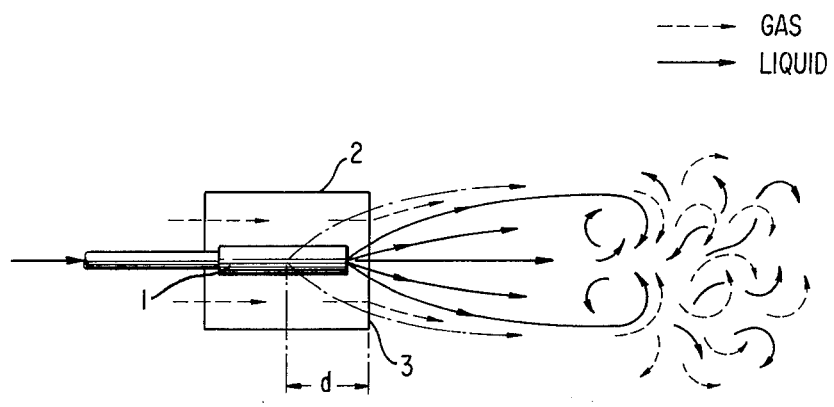
FIG. 1 is a longitudinal cross-sectional view of an outline of one embodiment of a gas-liquid scrubber, illustrating the principle incorporated therein.

Referring now to the drawings as shown in FIG. 1, liquid is ejected through the tip of a nozzle 1 in a divergent pattern, while gas is caused to flow in a direction parallel with the direction of the nozzle 1 through a gas ejecting tube 2, whose wall is parallel with the axis of the spray nozzle 1 and encompasses the nozzle. The gas is ejected through the tube 2 along, but from the rear of, the outer peripheral portion of the liquid mist which is being diffused divergently. With such an arrangement, if the liquid mist which is being ejected divergently through the spray nozzle 1 is not affected by the gas flow, then the liquid-mist-flow will be diffused, while losing kinetic energy gradually. However, according to the present invention, accelerated gas is introduced to contact the flow of the liquid mist which is losing kinetic energy. In this respect, the direction of the liquid-mist-flow will not be parallel with that of the gas, while the gas flow encompasses the liquid mist therewith. Thereafter, the kinetic energy of the gas will be reduced, thereby creating turbulent flows consisting of the mixture of gas and liquid mist, and then the turbulent flows go away from the spray nozzle 1. During this time, the microscopic mixing of gas and liquid mist will effectively take place.

The tip of the spray nozzle 1 is located adjacent to the exit edge of the gas ejecting tube. However, for enhancing the microscopic contact between the gas and the liquid mist, the spray nozzle 1 should preferably be located within the gas ejecting tube 2 but just inwardly thereof in a position where the liquid mist ejected therefrom will not impinge on the gas ejecting tube 2. Shown at *d* in FIG. 1 is a range of the position of the tip of a nozzle 1 spaced from the edge of the gas ejection tube, the foremost end of the range denoting the position of the nozzle advanced to a maximum extent while still being retained within the gas ejection tube and the rearmost end of the range denoting the position of the nozzle when retracted to the maximum extent where the mist ejected therefrom will still not contact the inner wall of the tube. When the tip of the ejection nozzle is in this range, the flow of the gas will effectively interfere with the flow of the liquid mist, thus presenting further improved gas-liquid contacting conditions.

Figure 2:
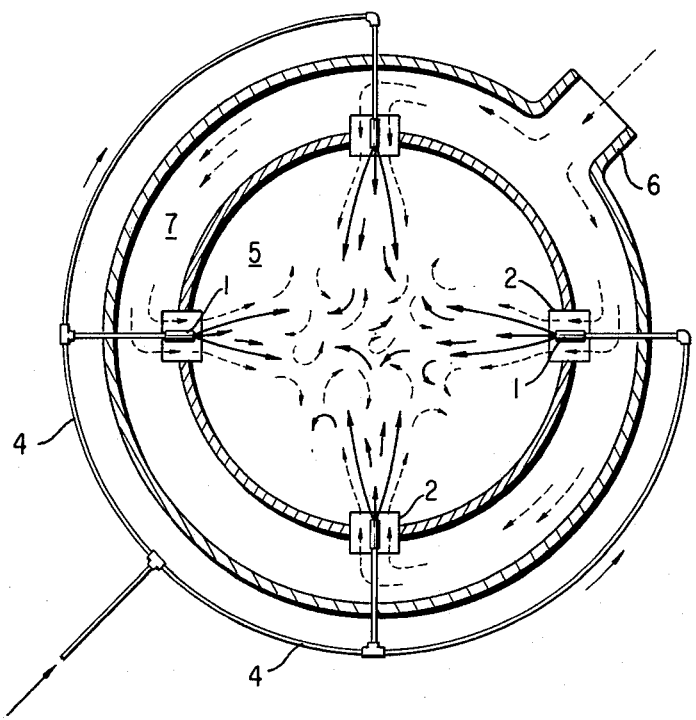
FIG. 2 is a horizontal cross-sectional view of a scrubber embodying the present invention.

Another embodiment of the present invention is shown in FIG. 2, wherein a plurality of nozzles 1 of a construction similar to that shown in FIG. 1 are provided being oriented to direct liquid flow in a radially inward direction and being diametrically opposed in pairs, and hence in opposing directions, such that liquid being fed through an arcuate pipe 4 common to all of the spray nozzles is ejected therethrough in opposing directions into a central contacting chamber 5. On the other hand, gas is introduced through an inlet 6 into an annular gas chamber 7 surrounding the central chamber 5 and through the gas ejection tubes 2 encompassing the nozzles 1 and facing each other, and then into the central contacting chamber 5. At this time, the relationship of gas to liquid is the same as described with reference to the embodiment illustrated in FIG. 1. In other words the gas flow encompasses the flow of the liquid mist, after which the mixture flows thus prepared will impinge on each other centrally of chamber 5. The impinging action of the mixture flows will aid in improving the contacting efficiency of the gas and the liquid mist.

As is apparent from the foregoing description, according to the present invention, liquid is ejected into a free space, while gas is caused to flow only through the encompassing gas ejecting tubes having a constant cross-sectional area or configuration, such that the least pressure loss will be obtained. In addition, a plurality of microscopic contacting spots between the gas and the liquid mist will be produced, despite the small pressure loss, thus presenting enhanced contacting efficiency.

Since the relative position of the gas ejecting tube 2 to the spray nozzle 1 is so determined, as has been described hereinbefore, for enhancing the encompassing phenomenon of the liquid mist with the gas flow, there will result less pressure loss and yet improved contacting condition between the gas and the liquid mist than in devices heretofore known. A further advantage is that the aforesaid enhanced contacting condition may be achieved independently of the ratio, in amount, of the gas to the liquid.

Obviously, many modifications and variations of the present invention are possible in light of these teachings. It is to be understood therefore that within the scope of the appended claims, the invention may be practiced otherwise than as specifically described herein.

What is claimed as new and desired to be secured by Letters Patent of the United States is:

1. A gas-liquid contacting process, comprising the steps of:

disposing a plurality of liquid spray nozzles respectively within a plurality of gas ejection tubes of constant cross-sectional configuration; so as to form a plurality of spray nozzle-gas ejection tube assemblies, in such a manner that each of said nozzles is located within each of said tubes and along the longitudinal, axial line thereof such that the tips of said nozzles are disposed inwardly of the gas ejecting edges of said tubes so that the liquid mist sprayed through said nozzles will not impinge upon the inner peripheries of said tubes;

arranging said assemblies in an array about an enclosed central chamber, and in oppositely disposed pairs, so that the discharge ends of said assemblies are directed inwardly toward the center of said chamber and the liquid-gas discharges of said oppositely disposed paired assemblies are disposed toward each other;

introducing a liquid into a single conduit substantially surrounding said central chamber and fluidically connected to each of said liquid spray nozzles for supplying said liquid to said spray nozzles;

introducing a positively accelerated gas into a chamber completely surrounding said central chamber and fluidically connected to each of said gas ejection tubes in a co-planar manner;

ejecting said liquid divergently from each of said spray nozzles; and ejecting said accelerated gas through each of said ejection tubes in a direction parallel with the axis of each of said spray nozzles and said tubes in a manner that the gas will be ejected along and from the rear of the outer periphery of the liquid mist which is being diffused divergently, so as to interact with said sprayed liquid and cause the development of turbulent flow patterns downstream of said assemblies, whereby said contacting and mixing of said liquid and said gas is enhanced due to the interaction between said liquid and said gas within the vicinity of each assembly as well as being due to the interaction between said gas-liquid mixtures within said central chamber as a result of said oppositely disposed paired assemblies.

2. A gas-liquid contacting scrubber, comprising:

a plurality of spray nozzles for ejecting liquid in a divergent manner therefrom;

a plurality of gas ejection tubes, of constant cross-sectional configuration, respectively encompassing the outer peripheries of said spray nozzles and disposed in parallel relation with the respective longitudinal axes of said nozzles;

said nozzles being disposed within said tubes along the longitudinal axial lines thereof at such positions that the tips of said nozzles are disposed inwardly of the gas ejecting edges of said tubes so that the liquid mist sprayed through said nozzles will not impinge upon the inner peripheries of said tubes;

said nozzles and tubes being disposed in an array about an enclosed chamber, and in oppositely disposed pairs, such that the discharge ends of said nozzles and tubes are directed inwardly toward the center of said chamber and the liquid-gas discharges of said oppositely disposed paired nozzles and tubes are disposed toward each other;

a single arcuate conduit means substantially surrounding said central chamber and fluidically connected to each of said nozzles for supplying said liquid to said nozzles; and chamber means completely surrounding said central chamber and fluidically connected to each of said tubes in a co-planar manner for supplying a positively accelerated gas to said tubes, whereby said gas ejected from said tubes in a direction parallel to said longitudinal axes of said nozzles interacts with said liquid ejected from said nozzles in a divergent manner so as to produce turbulent flow patterns downstream of said nozzles and tubes and thereby enhance the liquid-gas contact, and said liquid-gas mixtures from said nozzles and tubes interact within said central chamber as a result of said oppositely disposed paired nozzles and tubes so as to thereby enhance said liquid-gas contact still further.

* * * * *